United States Patent
Parvereshi et al.

[11] Patent Number: 5,606,680
[45] Date of Patent: Feb. 25, 1997

[54] REALTIME CLOCK WITH PAGE MODE ADDRESSING

[75] Inventors: Jehangir Parvereshi, Carrollton; Frederick G. Broell, Plano, both of Tex.

[73] Assignee: Benchmarq Microelectronics, Dallas, Tex.

[21] Appl. No.: 343,755

[22] Filed: Nov. 22, 1994

[51] Int. Cl.[6] .......................... G06F 12/00; G06F 12/02; G06F 9/34; G06F 9/26
[52] U.S. Cl. ................... 395/410; 395/412; 395/421.04; 395/421.07; 395/421.1; 395/402
[58] Field of Search ........................... 395/441, 433, 395/410, 421.1, 413, 421.02, 402, 412, 421.04; 327/156

[56] References Cited

U.S. PATENT DOCUMENTS

| | | | |
|---|---|---|---|
| 4,317,169 | 2/1982 | Panepinto, Jr. et al. | 395/433 |
| 5,220,201 | 6/1993 | Kawasaki et al. | 327/156 |
| 5,469,548 | 11/1995 | Callison et al. | 395/441 |

*Primary Examiner*—Jack A. Lane
*Assistant Examiner*—Than V. Nguyen
*Attorney, Agent, or Firm*—Gregory M. Howison

[57] ABSTRACT

A realtime clock integrated circuit includes a memory (30) that has a plurality of addressable locations therein. The memory (30) has two portions, a lower portion and an upper portion. The lower portion is addressed by the seven least significant bits which are extracted from an input address bus (50). The seven address bits are latched in an address latch (54) for input to the address input of the memory (30). An eighth most significant address bit is received from an external line (64), which is attached to a separate bus on a personal computer other than that of the bus (50). The eighth most significant bit is latched in an address latch (62) for presentation to the most significant bit of the address input memory (30). When this most significant bit is high, the upper portion of the memory (30) is accessed.

6 Claims, 8 Drawing Sheets

SQUARE — WAVE FREQUENCY/PERIODIC INTERRUPT RATE

| REGISTER A BITS | | | | | | | SQUARE WAVE | | PERIOD INTERRUPT | |
|---|---|---|---|---|---|---|---|---|---|---|
| OSC2 | OSC1 | OSC0 | RS3 | RS2 | RS1 | RS0 | FREQUENCY | UNITS | PERIOD | UNITS |
| 0 | 1 | 0 | 0 | 0 | 0 | 0 | NONE | | NONE | |
| 0 | 1 | 0 | 0 | 0 | 0 | 1 | 256 | Hz | 3.90625 | ms |
| 0 | 1 | 0 | 0 | 0 | 1 | 0 | 128 | Hz | 7.8125 | ms |
| 0 | 1 | 0 | 0 | 0 | 1 | 1 | 8.192 | KHz | 122.070 | µs |
| 0 | 1 | 0 | 0 | 1 | 0 | 0 | 4.096 | KHz | 244.141 | µs |
| 0 | 1 | 0 | 0 | 1 | 0 | 1 | 2.048 | KHz | 488.281 | µs |
| 0 | 1 | 0 | 0 | 1 | 1 | 0 | 1.024 | KHz | 976.5625 | µs |
| 0 | 1 | 0 | 0 | 1 | 1 | 1 | 512 | Hz | 1.953125 | ms |
| 0 | 1 | 0 | 1 | 0 | 0 | 0 | 256 | Hz | 3.90625 | ms |
| 0 | 1 | 0 | 1 | 0 | 0 | 1 | 128 | Hz | 7.8125 | ms |
| 0 | 1 | 0 | 1 | 0 | 1 | 0 | 64 | Hz | 15.625 | ms |
| 0 | 1 | 0 | 1 | 0 | 1 | 1 | 32 | Hz | 31.25 | ms |
| 0 | 1 | 0 | 1 | 1 | 0 | 0 | 16 | Hz | 62.5 | ms |
| 0 | 1 | 0 | 1 | 1 | 0 | 1 | 8 | Hz | 125 | ms |
| 0 | 1 | 0 | 1 | 1 | 1 | 0 | 4 | Hz | 250 | ms |
| 0 | 1 | 0 | 1 | 1 | 1 | 1 | 2 | Hz | 500 | ms |
| 0 | 1 | 1 | X | X | X | X | 32.768 | KHz | SAME AS ABOVE DEFINED BY RS3-RS0 | |

FIG. 4

CONTROL/STATUS REGISTERS

| REG. | LOC. (HEX) | READ | WRITE | BIT NAME AND STATE RESET ||||||||
|---|---|---|---|---|---|---|---|---|---|---|---|
| | | | | 7 (MSB) | 6 | 5 | 4 | 3 | 2 | 1 | 0 (LSB) |
| A | 0A | YES | YES 1 | UIP | OS2 | OS1 | OS0 | RS3 | RS2 | RS1 | RS0 |
| | | | | na | na | na | na | na | na | na | na |
| B | 0B | YES | YES | UTI | PIE | AIE | UIE | 0 | OF | HF | DSE |
| | | | | na | 0 | 0 | 0 | 0 | 0 | na | na |
| C | 0C | YES | NO 2 | INTF | PF | AF | UF | - | 32KE | - | - |
| | | | | 0 | 0 | 0 | 0 | - | - | - | - |
| D | 0D | YES | NO | VRT | - | - | - | - | - | - | - |
| | | | | na | - | - | - | - | - | - | - |

REALTIME CLOCK WITH PAGE MODE ADDRESSING

TECHNICAL FIELD OF THE INVENTION

The present invention pertains in general to realtime clocks for use with a personal computer and, more particularly, to a method and apparatus for increasing the amount of storage space provided by the realtime clock within the constraints of the normal realtime clock addressing techniques.

BACKGROUND OF THE INVENTION

Realtime clocks became a common peripheral system on personal computers in the mid 1980s. There were a number of reasons that these were standardized, one of the most important being the need to maintain some type of non-volatile clock system that could maintain a clock and calendar independent of the power source of the computer. This was typically achieved through the use of a separate battery that was recharged during use of the computer. Another reason that the realtime clock circuit was utilized, was the incorporation of some memory that was rendered non-volatile due to the backup battery. This memory was utilized to store configuration data for the computer. Therefore, upon power up of the computer, this configuration information could be utilized to fully configure the computer and even allow the user to enter customized configuration information. However, early computers needed very little configuration data, and thus memory was not an issue.

As computers have become more sophisticated, the level of configuration provided by the BIOS of the computer has increased the need for memory resources on the realtime clock. Without these memory resources, the user would be required to load this configuration information every time the computer was powered up. It then being lost when the computer powers down. However, there is a limitation to the amount of memory that can be accessed on the realtime clock. This is due to the fact that the original configuration of the realtime clock allowed only seven bits of address space to be allocated to the realtime clock, even in an 8-bit system. This is due to the fact that the eighth bit of addressing in an 8-bit system is dedicated to a non-maskable interrupt (NMI). As such, the seven bits of addressing only allows 128 addressable locations to be accessed, these typically being bytes. Unfortunately, the need for more sophisticated configurations has made this level of addressing and this level of memory inadequate.

SUMMARY OF THE INVENTION

The present invention disclosed and claimed herein comprises a realtime clock that interfaces with a personal computer having a first I/O port that provides a multiplexed data/address. The multiplexed data/address is generated such that eight bits of data can be transferred to or from the realtime clock and a seven bit address can be transferred thereto for addressing 128 bytes of information. The realtime clock includes a memory having 256 addressable locations requiring an 8-bit address input. An address latch is operable to latch the seven address bits from the first I/O port, the latched output thereof input to the seven least significant bits of the memory. An additional address latch is operable to latch an external bit that is received from a second I/O port in the personal computer that is received from a bus internal to the PC that is different from the bus that generates the address bits for output on the first I/O port. The address bit output on the second I/O port allows the personal computer to access an additional 128 bytes of data from the RTC memory on the data bus associated with the first I/O port.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a table for the square wave frequency/periodic interrupt rate;

FIG. 5 illustrates a table for the control/status registers;

DETAILED DESCRIPTION OF THE INVENTION

Figure 1:
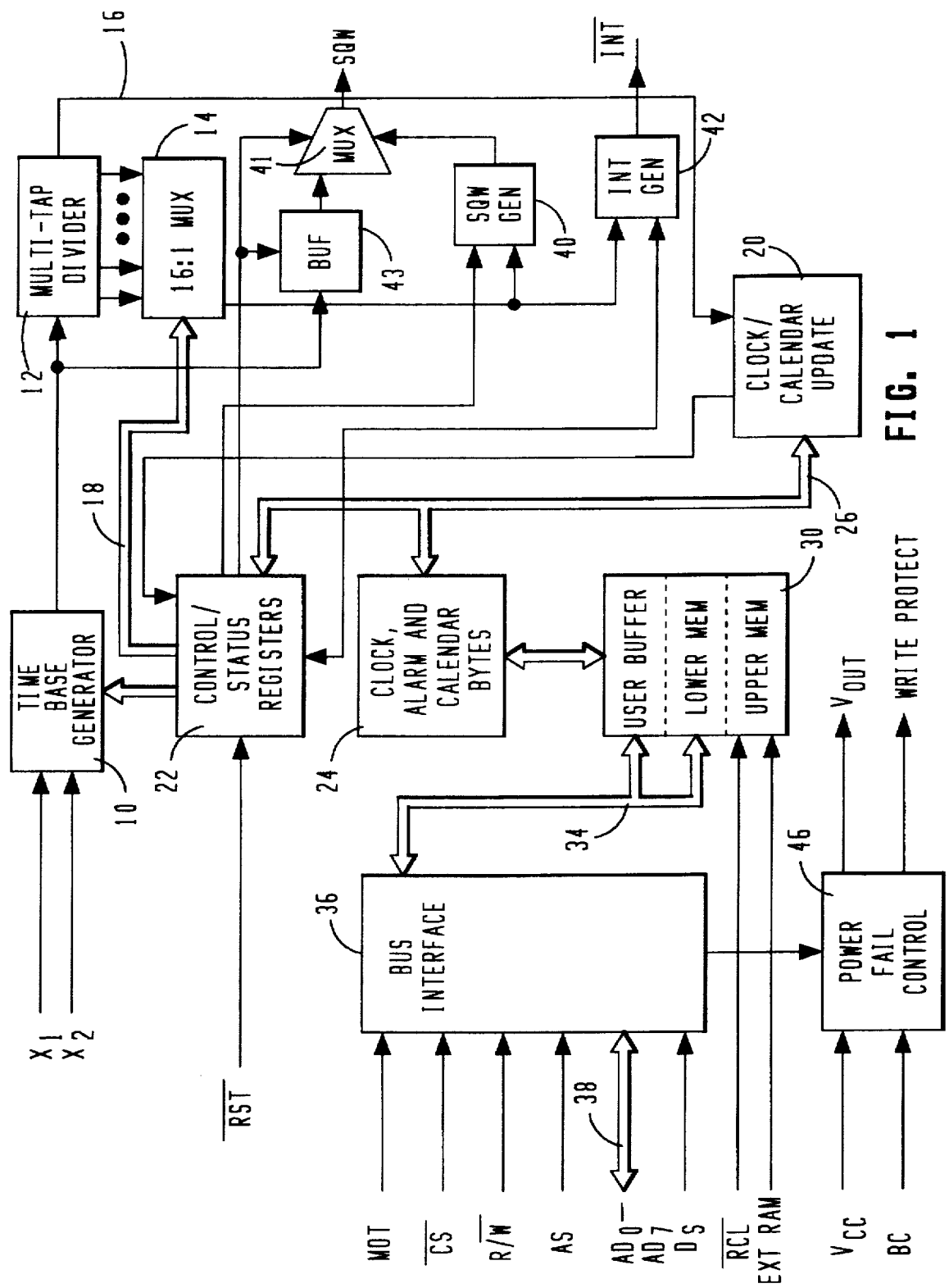
FIG. 1 illustrates an overall block diagram of the realtime clock integrated circuit.

Referring now to FIG. 1, there is illustrated a block diagram of the overall realtime clock (RTC) integrated circuit. At the heart of the RTC is a time base generator 10 having two inputs, an $X_1$ input and an $X_2$ input, these being connected to an external crystal. The output of the time base generator 10 is input to a multi-tap divider 12, which provides multiple outputs that are input to a 16:1 multiplexer circuit 14 and also provides a final tap output on a line 16. The 16:1 multiplexer 14 is operable to select one of the multiple taps of the divider 12 to provide a time base to select operations of the circuit. This is controlled by an input control bus 18 to the multiplexer 14.

A clock/calendar update circuit 20 is provided that is controlled by the divided time signal on line 16 that is output by the divider 12. The update circuit 20 is operable to keep track of the time and also the date, once initialized. The update circuit 20 is interfaced with control/status registers 22 and also with a buffer circuit 24, which is operable to store the clock, alarm and calendar information. The registers 22 and the buffers 24 are interfaced with the update circuit 20 via a bus 26. Additionally, the buffers 24 are interfaced with a memory 30, which is comprised of three sections, a user buffer, a lower memory and an upper memory. The user buffer and lower memory are comprised of 128 bytes of memory, and the upper memory is comprised of 128 bytes of memory. The lower portion of the memory is divided up such that the user buffer is comprised of 14 bytes, and the remaining portion for the storage registers is comprised of 114 bytes. The memory 30 is interfaced via an address/data bus 34 with a bus interface 36. The bus interface 36 is operable to interface with address and data on a multiplexed bus 38 and also with various control signals, the control signal MOT, the control signals CS-Bar, the Read/Write signal R/W-Bar, the signal AS and the signal DS.

These are external pins of the integrated circuit. Additionally, a RAM Clear input (RCL-Bar) is provided to the memory 30 and an EXTRAM signal is also input to the memory 30, the operation of which will be described hereinbelow. A reset signal (RST-Bar) is input to the control/ status registers 22. The control/status registers 22 are operable to control an SQW generator 40, which is operable to generate a square wave (SQW). The output of SQW generator 40 is input to one input of a multiplexer 41, the other input of the multiplexer connected to the output of a buffer 43. The buffer 43 is connected to the output of the timebase generator 10. The buffer 43 and the multiplexer 41 are both controlled by one of the registers in the control/status registers 22. As will be described hereinbelow, the SQW generator 40 is operable to provide a square wave output from the divide chain, the output selected by the multiplexer 14, and then input to the distal end of the multiplexer 41. Alternately, the user can select the output of the timebase generator 10 with the setting of the 32KE bit in the C-Register. The registers 22 are also operable to control an interrupt generator 42, which is operable to generate an interrupt signal INT-Bar. The square wave generator 40 and the interrupt generator 42 are connected to the output of the 16:1 multiplexer 14 to receive the timing information therefrom. Note that the multiplexer 14 is programmable such that the frequency of the square wave generator 40 can be changed, in addition to the timing for the periodic interrupt signal output by the interrupt generator 42. This will be described hereinbelow.

An additional function provided on the chip is a power fail control circuit 46, which is operable to receive the power input $V_{CC}$ and also a battery backup input BC. The supply input is the main supply to the integrated circuit, whereas the BC input comprises a battery backup for rendering the system non-volatile. The output of the power fail control circuit 46 is the voltage $V_{OUT}$, which voltage comprises the main voltage to the circuit. The power fail control circuit 46 is operable to determine if $V_{CC}$ is present, and if not, to connect the $V_{OUT}$ terminal to the battery. Additionally, a Write Protect signal on a line 48 is provided, which is an output from the pin that can be connected to an external circuit, this indicating that the voltage $V_{OUT}$ has fallen below the voltage $V_{CC}$ by a predetermined amount and that external circuits must enter into some type of Write protection mode. For example, if a memory was connected to the chip, this would indicate that critical data should be written to data locations before power was removed. These data locations are associated with a non-volatile storage medium. This is a conventional operation and it will not be described in more detail hereinbelow.

The inputs to the bus interface allow for the various operations of the RTC chip. The MOT input selects bus timing for two different types of architectures, one being referred to as the Motorola® architecture and one being referred to as the Intel® architecture. This input is tied either to $V_{CC}$ or to $V_{SS}$. The DS input is a data strobe input that controls data transfer during a given bus cycle when the MOT input is connected to $V_{CC}$. During a Read cycle in this mode, the RTC circuit drives the bus 38 after the rising edge on DS. During the Write cycle, the falling edge on DS is used to latch Write data into the chip. When the MOT input is connected to $V_{SS}$, it is connected to a signal similar to RD-Bar, MEMR-Bar or I/OR-Bar in an Intel®-based system. The falling edge on DS is used to enable the outputs during a Read cycle. The R/W-Bar input is a Read/Write input that, when MOT is equal to $V_{CC}$, the R/W-Bar identifies the direction of data transfer. A high level indicates a Read bus cycle and a low indicates a Write bus cycle. When the MOT input is equal to the $V_{SS}$, the R/W-Bar input is provided a signal similar to WR-Bar, MEMR-Bar or I/OW-Bar in the Intel®-based system.

The CS-Bar is a chip select input that is driven low and held stable during the data-transfer phase of a bus cycle. The INT-Bar output is an open-drain output that allows an alarm INT-Bar to be valid in battery-backup mode. The SQW output is a square wave output that has a programmable frequency square-wave signal during normal operation. The EXTRAM input is an enable signal for a page mode operation. This allows the upper 128 bytes of the memory 30 to be enabled, as will be described in more detail hereinbelow. The RCL-Bar is the RAM clear input that presets all bits in the memory 30. However, the contents of the registers 22 and the buffers 24 is unaffected. The RST-Bar input to the registers 22 is operable to clear a number of register bits.

Figure 2:
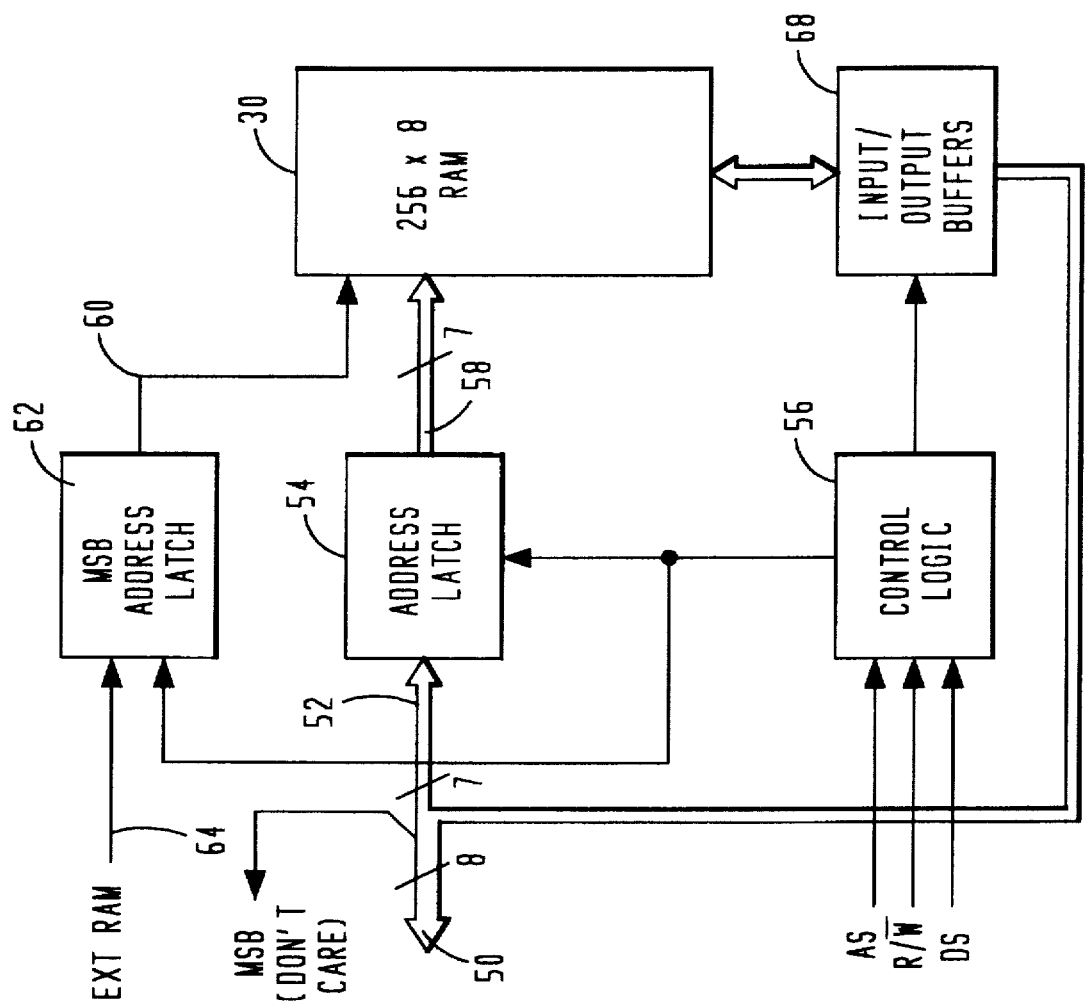
FIG. 2 illustrates a block diagram of the addressing scheme of the present invention.

Referring now to FIG. 2, there is illustrated a detailed block diagram of the EXTRAM operation of the present invention. The bus 38 is an 8-bit bus that, after processing through the interface 36 (not shown), still provides an 8-bit bus 50. During an address mode, only seven bits of address, the $A_0$–$A_6$ address bits, are valid. These are input via a 7-bit bus 52 to an address latch 54 for latching therein via a control logic block 56. However, the MSB bit of the address input is a "Don't Care" bit, as it constitutes an NMI interrupt signal. Therefore, the RTC integrated circuit cannot be connected to a bus wherein an eighth bit of address is provided. As such, the system is limited to a 7-bit address. This will, therefore, allow for addressing of only 128 bytes of information. A 7-bit latched address bus 58 is provided on the output of the latch 54 and input to the address input of the RAM 30. However, in order to access the upper portion of the memory 30, it is necessary to supply an MSB bit. This is provided on an input address line 60, which is output by an MSB address latch 62. This address bit is connected to the EXTRAM signal on a line 64. This is provided external of the address bus 50. This address bit is latched into the latch 62 via the control signal from the control logic block 56. The control logic block 56 is also operable to control an output buffer 68 during a Read or Write operation to interface the data input of the RAM 30 with the 8-bit bus 50. Therefore, data can be transferred from the RAM 30 to the 8-bit address/data bus 50.

Figure 3:
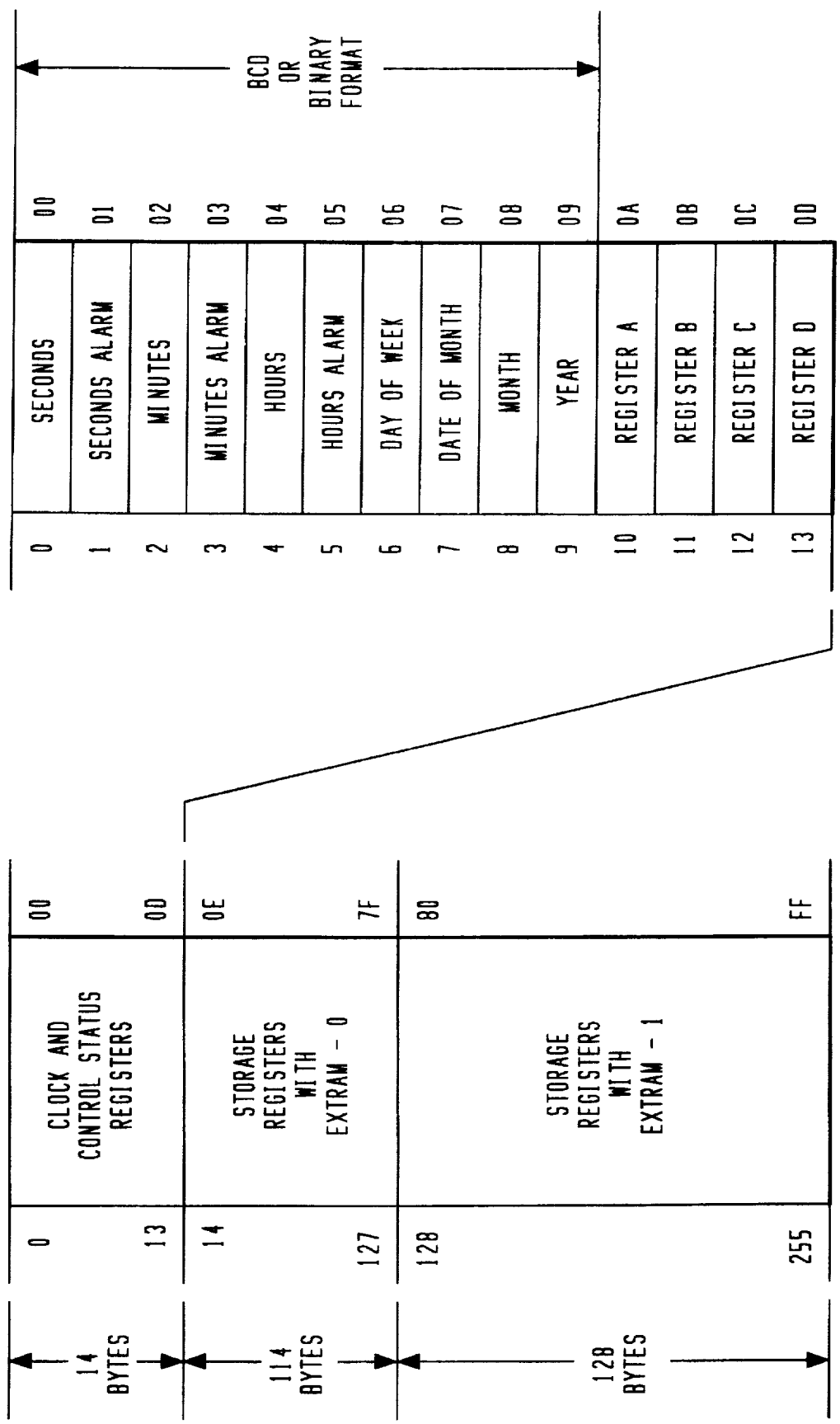
FIG. 3 illustrates a diagrammatic view of the address map.

Referring now to FIG. 3, there is illustrated an address map for the present invention. In the lower portion of the address map, there are provided fourteen bytes of clock and control/status registers and 242 bytes of general, non-volatile storage. Of these 242 bytes, 114 bytes are addressed with the first seven bits of address provided on the bus 50 and the upper portion, or remaining 128 bytes, is accessed with the EXTRAM bit. It can be seen that the upper fourteen bytes contain information regarding the clock/calendar information and also the information in four registers, Register A, Register B, Register C and Register D. The upper 14 bytes in the control status portion is updated during an update period, which is one second. During this update period, the contents of the clock and calendar locations during the update cycle are updated at the end of each update period, and then the various register updates are copied into the user buffer that is accessed by the host processor (external). In one register, Register A, there is a bit referred to as the Update-In-Progress bit (UIP), which prevents any kind of bus contention. This bit is cleared after the update period.

The time-of-day, alarm and calendar bytes can be programmed. This is achieved by modifying the contents of Register B. This is achieved by first inhibiting transfers between the RTC bytes and the user buffers 24. The appropriate value is then written to all of the time, alarm and calendar locations, and then the system released to allow update transfers. The time, alarm and calendar information in the appropriate locations will then be updated in the selected format on the next update.

The square wave output (SQW) of the square wave generator 40 is operable to divide the time base of approximately 32.768 KHz to produce a 1 Hz update frequency for the clock and calendar on line 16. The other thirteen taps to the multiplexer 14 are used to determine the frequency of the square wave generator 40 and also of the interrupt generator 42. The thirteen taps of the multiplexer 14 are selected by the bits on bus 18, which is a 4-bit bus comprised of the four least-significant bits of Register A, RS0–RS3. Register B has a square wave enable bit (SQWE) that, if set to a 1, enables the square wave output. A 32.768 KHz output can be selected by setting three bits, OSC2-OSC0, in Register A to "011", while SQWE is set to 1 and a bit 32KE is set equal to 1. In the appropriate register, 8 bits and the setting thereof are illustrated in FIG. 4, for both the square wave output and the periodic interrupt output.

It can be seen from FIG. 4 that the interrupt is a periodic interrupt and has various values. This periodic interrupt is programmed to occur once every 122 µs to 500 ms. There are three interrupts, the periodic interrupt, the alarm interrupt and the update interrupt. The periodic interrupt, as described above, is programmable, whereas the alarm interrupt is also programmable to occur only once per second up to once per day. This is active in the battery-backup mode, providing a wakeup feature. The update-ended interrupt occurs at the end of each update cycle. Each of these interrupt events is enabled by an individual interruptenable bit in Register B. When an event occurs, its event flag bit in Register C is set. If a corresponding event enable bit is also set, then an interrupt request is generated. The interrupt request flag bit (INTF) of Register C is set with every interrupt request. Reading the contents of Register C clears all flag bits, including INTF, and makes the INT-Bar output a high impedance output.

The alarm interrupt is used during the RTC battery-back up mode to wake up the system from the suspend mode. This wakeup feature can be implemented in a number of ways, as will be described hereinbelow. During each update cycle, the RTC compares the hours, minutes and seconds bytes in the buffers 24 with the three corresponding alarm bytes. If a match of all bytes is found, the alarm interrupt event flag bit, AF, in Register C is set equal to "1". If the alarm interrupt event is enabled, an interrupt request is generated. An alarm byte may be removed from the comparison by setting it to a "Don't Care". An alarm byte is set to a "Don't Care" state by writing a 1 to each of its two most significant bits. A Don't Care state may be used to select the frequency of alarm interrupt events as follows:

If none of the three alarm bytes is "Don't Care", the frequency is once per day, when hours, minutes and seconds match.

If only the hour alarm byte is "Don't Care", the frequency is once per hour, when minutes and seconds match.

If only the hour and minute alarm bytes are "Don't Care", the frequency is once per minute, when seconds match.

If the hour, minute and second alarm bytes are "Don't Care", the frequency is once per second.

The update cycle, the third interrupt event, is indicated with an update cycle ended flag bit (UF) in Register C that is set to a "1" at the end of an update cycle. If the update interrupt enable interrupt bit (UIE) in Register B is "1" and the update transfer inhibit bit (UTI) in Register B is "0", then an interrupt request is generated at the end of each update cycle.

In order to access the RTC bytes in the buffers 24, this being in the low addressed portion of the memory 30, the EXTRAM pin must be low. Time and calendar bytes read during an update cycle may be in error. Three methods to access the time and calendar bytes without ambiguity are:

Enable the update interrupt event to generate interrupt requests at the end of the update cycle. The interrupt handler has a maximum of 999 ms to access the clock bytes before the next update cycle begins.

Poll the update-in-progress bit (UIP) in Register A. If UIP=0, the polling routine has a minimum time to access the clock bytes.

Use the periodic interrupt event to generate interrupt requests during a predetermined time between update cycles, such that UIP=1 always occurs between the periodic interrupts. The interrupt handler has a minimum time to access the clock's bytes.

When power is first applied to the RTC chip and $V_{CC}$ is above a predetermined internal threshold voltage, the internal oscillator and frequency divider are turned on by writing a "010" pattern to bits 4–6 of Register A. A pattern of "011" behaves as "010", but additionally transforms Register C into a Read/Write register. This allows the 32.768 KHz output on the square wave 10 to be turned on. A pattern of "11X" turns the oscillator on, but maintains the frequency divider disabled. Any other pattern to these bits keeps the oscillator off.

The four control/status registers are accessible regardless of the status of the update cycle. The Register A is utilized to program the frequency of the square wave and the periodic event rate and also the oscillator operation. Register A provides the status of the update cycle and contains the bits RS0–RS3, OS0–OS2 and UIP. The RS0–RS3 bits provide a frequency selection in the SQW output and in the periodic interrupt rate. The OS0–OS2 bits control the state of the oscillator and the divider stages. As described above, a pattern of "010" enables RTC operation and a pattern of "011" additionally transforms Register C into a Read/Write register. This allows the 32.768 KHz output on the square wave pin to be turned on. When "010" is written, the RTC begins its first update operation after 500 ms. The UIP bit is a Read Only bit that is set prior to the update cycle. When UIP is equal to "1", an RTC update cycle may be in progress. UIP is cleared at the end of each update cycle, this bit also being cleared when the update transfer inhibit (UTI) bit in Register B is set equal to "1". Register B is a register that enables the update cycle transfer operation, the square-wave output, interrupt events and daylight savings time adjustment. Register B is utilized to select the clock and calendar data format. The Register B bits are also illustrated in FIG. 5. The DSE bit enables daylight savings time, when written to a "1". The HF bit selects the time of day and the alarm hour format, with "1" providing for a 24-hour format and "1" providing for a 12-hour format. The F-Bit is the data format bit that selects the numeric format in which the time, alarm and calendar bytes are represented with a "1" setting it to binary format and a "0" setting it to a BCD format. The SQWE bit is the square wave output enable bit that enables it when it is set to a "1". The UIE bit is the update cycle interrupt enable that enables an interrupt request due to an update ended interrupt event with a "1" enabling this feature. The UIE bit is automatically cleared when the UTI bit equals "1". The AIE bit enables an interrupt request due to an alarm interrupt event, wherein a "1" enables this feature. The PIE bit enables an interrupt request due to a periodic interrupt event, a "1" enabling this feature. The UTI bit inhibits the transfer of RTC bytes to the user buffer with a "1" inhibiting transfer and a "0" allowing transfer. Register C is a Read Only event status register. Bits 0, 1 and 3 are unused bits that are always set to the zero. The 32 KE bit is set to a "1" only when the OSC2–OSC0 bits in Register A are set to "011". Setting OSC2–OSC0 to anything other than "011" clears this bit. If SQWE in Register B and 32KE are set, a 32.768 KHz waveform is output on the square wave output. The UF bit is set to "1" at the end of the update cycle. This is the update event flag. Reading Register C clears this bit. The AF bit is the alarm event flag that is set to "1" when an alarm event occurs. Reading Register C clears this bit. The Periodic Event Flag is set to a "1" every time a periodic event occurs. The INTF bit is an interrupt request flag that is set to a "1" when any of the following is true: AIE=1 and AF=1, PIE=1 and PF=1 or UIE=1 and UF=1. Reading Register C clears this bit.

Register D is a Read-Only data integrity status register with bits 0–6 being unused and the seventh bit being the RT bit which indicates a valid RAM and time. If this bit is "1", this indicates a valid backup energy source is present. When the backup energy source is depleted, the RT bit is set to "0", indicating that data integrity of the RTC and storage registers is not guaranteed.

Figure 6:
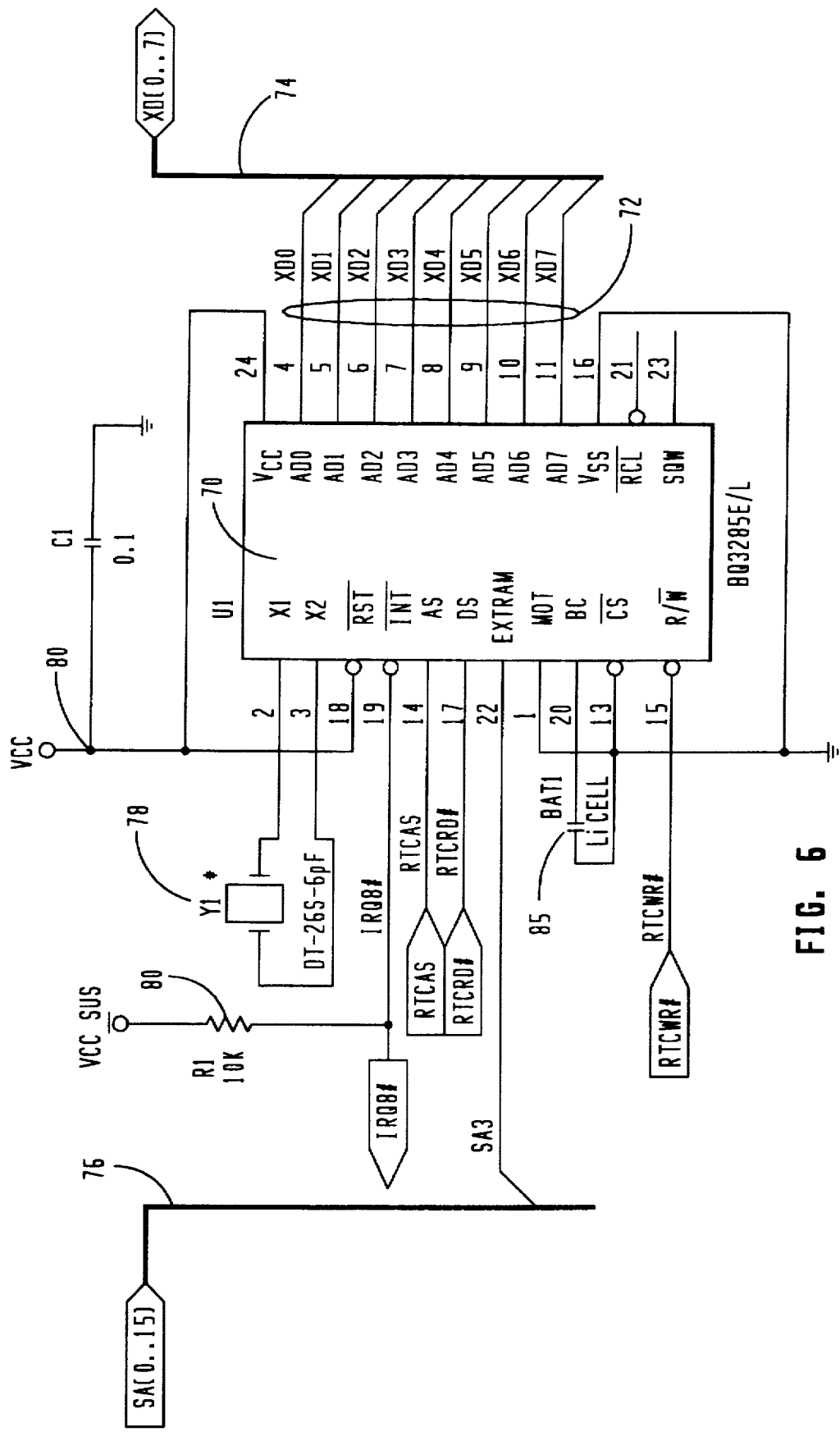
FIG. 6 illustrates a block diagram of the interconnection of the realtime clock with the PC in an ISA bus configuration.

Referring now to FIG. 6, there is illustrated a block diagram of the interconnection of the RTC with a personal computer. The RTC is represented by a single integrated circuit 70, having bits AD0–AD7 connected via line 72 to a bus 74. In a PC/AT application, the fourteen RTC register bytes and the remaining portion of the memory 30 will require two I/O ports. Since Bit 7 in the PC/AT BIOS is an NMI function, an additional I/O port is required to access the extended RAM via the EXTRAM bit. The PC/AT BIOS accesses the CMOS RAM through the following I/O ports:

TABLE 1

| I/O Address | Read/ Write | Description |
|---|---|---|
| 070H | W | CMOS RAM address register port, where: Bit 7 = 1; NMI disabled = 0; NMI enabled Bits 6—0 = Register and CMOS RAM address |
| 071H | R/W | CMOS RAM data register port |
| 074H | W | Extended CMOS RAM address register port, least-significant byte |
| 075H | W | Extended CMOS RAM address register port, most-significant byte |
| 076H | R/W | Extended CMOS RAM data register port |

The two RAM data areas are as set forth in Table 2:

TABLE 2

| Data Area | I/O Locations | Size (bytes) | Description |
|---|---|---|---|
| Default CMOS Data Area | 070H and 071H | Default: 64 Maximum: 128 | All BIOS variations use this area to store RTC, POST, and system configuration data. |
| Extended CMOS RAM Data Area | 074H, 075H, and 076H | Default: 2K Maximum: 64K | The PS/2 uses this area to store POS data. The Intel SL uses 074H and 076H to provide extended 128 CMOS RAM bytes for APM data. |

The preferred method for connecting the EXTRAM pin to the PCT/AT system is to utilize a system address bus. There are two techniques. The first technique is to hook up the SA3, SA2 and SA1 (system address) bus lines from the industry standard architecture (ISA) address bus to the EXTRAM pin. This is referred to by reference numeral 76. Illustrated in 76 is the interconnection utilizing the SA3 pin. The following table, however, illustrates the address/data ports through which the extra 128 bytes are accessed:

TABLE 3

| Address Line | I/O Ports | Read/ Write | Description |
|---|---|---|---|
| SA3 | 078H | W | Extra CMOS RAM address register port, where: Bit 7 = Reserved Bits 6—0 = Extra CMOS RAM address |
| SA3 | 079H | R/W | Extra CMOS RAM data register port |
| SA2 | 074H | W | Same as 078H |
| SA2 | 075H | R/W | Same as 079H |
| SA1 | 072H | W | Same as 078H |
| SA1 | 073H | R/W | Same as 079H |

Any one of the I/O port pairs illustrated in Table 3 that asserts RTC control signal AS, DS or WR-Bar should be selected.

The second technique is to hook-up an unused general purpose I/O port pin to write to the assigned I/O port; successive accesses to port 070H and 071H are directed to the extra 128-byte RAM bank.

FIG. 6 illustrates, as described above, interconnection with the SA3 bit in the ISA bus. Additionally, it can be seen that the $X_1$ and $X_2$ ports are connected to a crystal 78 with the RST-Bar input and the $V_{CC}$ input connected to an external power supply node 80. The INT-Bar signal is connected through a resistor 82 to another power supply node $V_{CC}$ SUS and also the interrupt request input to the BC. The BC input is connected to the positive terminal of a battery 84, the negative terminal thereof connected to ground, along with the CS-Bar and the $V_{SS}$ input.

Figure 7:
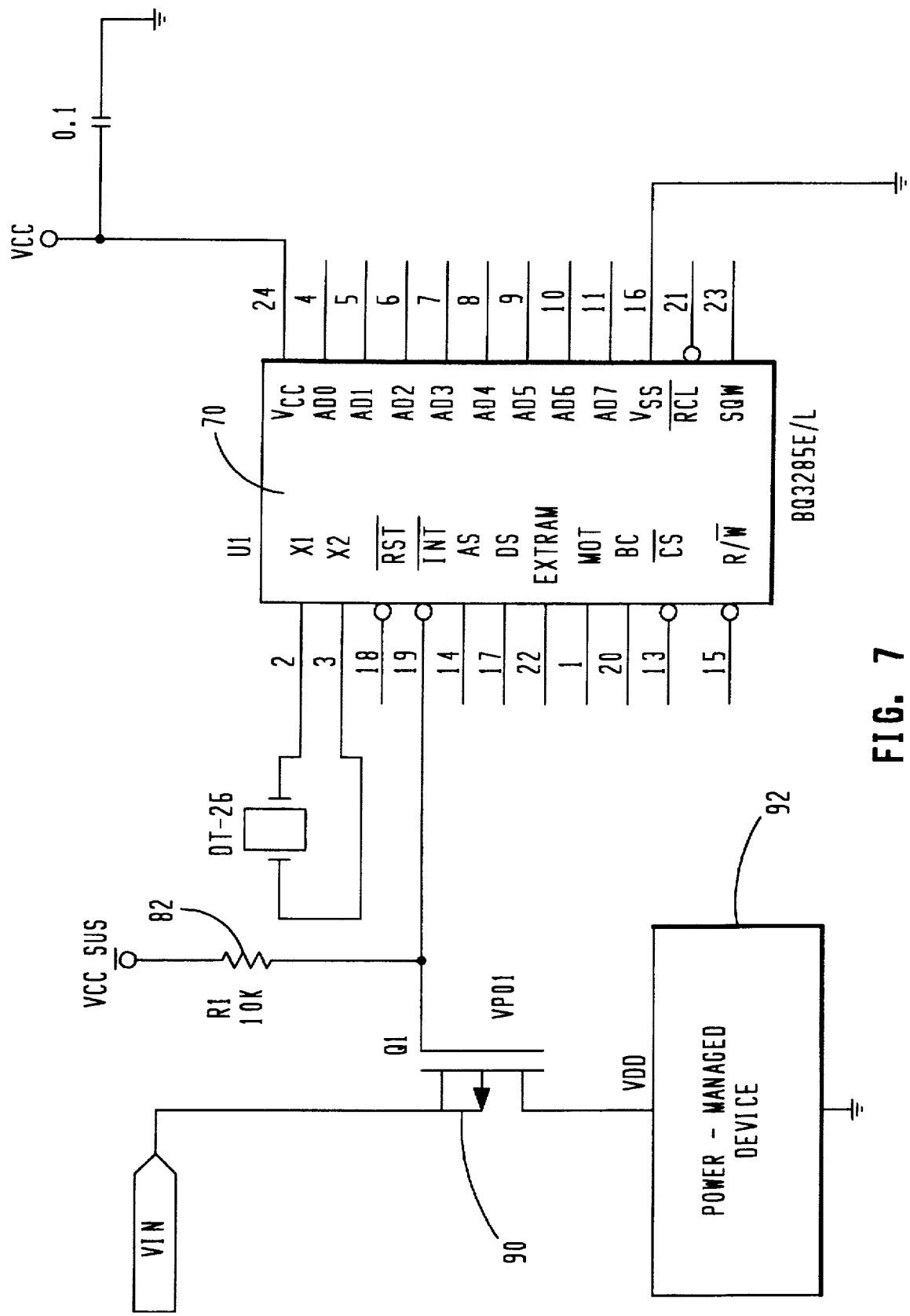
FIG. 7 illustrates a block diagram of the alarm interrupt operation.

Referring now to FIG. 7, there is illustrated an alternate embodiment of that of FIG. 6, depicting the alarm interrupt operation. In this mode, IC 70 has the INT-Bar output connected to the gate of an FET 90, one side of the source/drain path thereof connected to the input voltage, and the other side thereof providing a voltage $V_{DD}$ for input to a power-managed device 92. In this manner, the INT-Bar signal triggers the power management device 92 that may subsequently wake up the rest of the system. The INT-Bar pull-up resistor 82 must be tied to the $V_{CC}$ of the active portion of the core logic incorporating the power management device 92.

Figure 8:
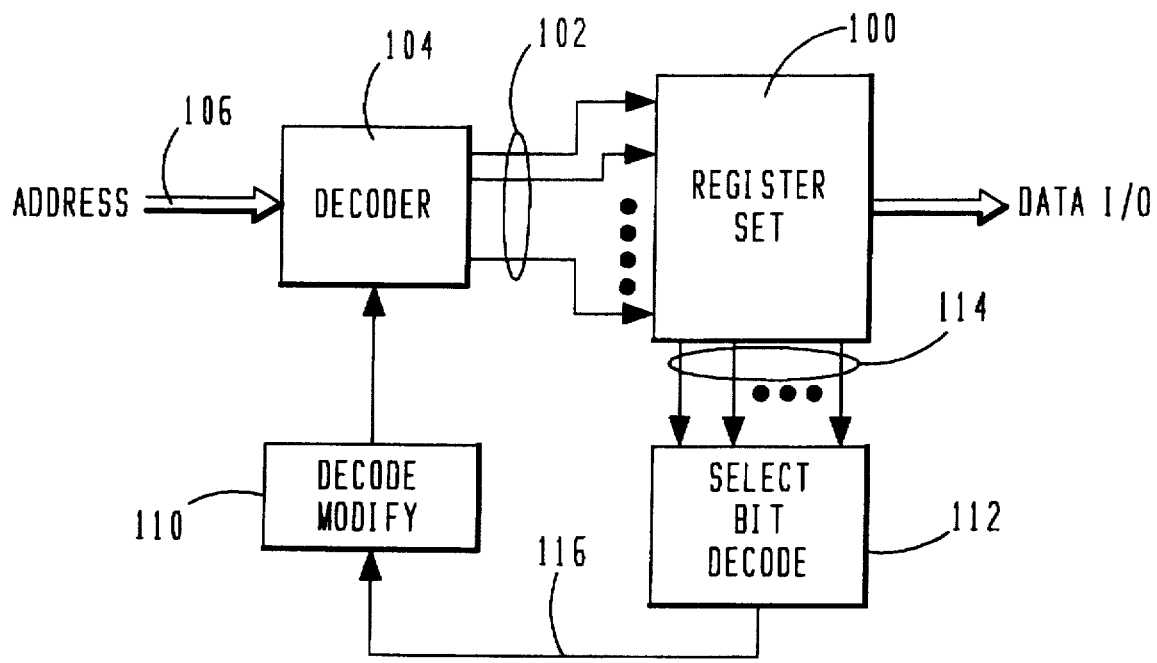
FIG. 8 illustrates a block diagram of the memory decoding operation associated with the 32KE operation.

Referring now to FIG. 8, there is illustrated a block diagram of the operation to set the 32KE bit in the C-register. A block 100 is provided that represents register A through register C. Additionally, this block 100 can represent any type of memory wherein a plurality of address locations are provided. Each of the registers in the registers block 100 is addressable through a plurality of address lines 102. The address lines 102 are output by a decoder circuit 104, which is operable to receive an address on an address bus 106 and decode the address to activate one of the lines 102. Additionally, the decoder 104 is operable to provide a bit-qualified decode operation wherein select bits can be read to or written from. The operation of the decoder can be modified by a block 110, such that the decoder can map the address 106 to different portions of the register or modify the actual decode operation to a given register. As will be described hereinbelow, a single bit can be set to be as a read-only bit in a given addressable location or a Read/Write bit.

The decode modification circuit or block 110 is controlled by a decode output signal on a line 116 which proceeds from a select bit decode block 112. The select bit decode block 112 is operable to receive select bits from the register set 100, represented by lines 114. In the preferred embodiment, these are three bits from register A. However, they could be any bit from any register, it being anticipated that these could in fact be latched from different addressable locations with sequential accesses required. A specific decode operation is provided, such that when the logic state of the lines 114 is at a predetermined logic state, this will result in activation of the line 116.

Figure 9:
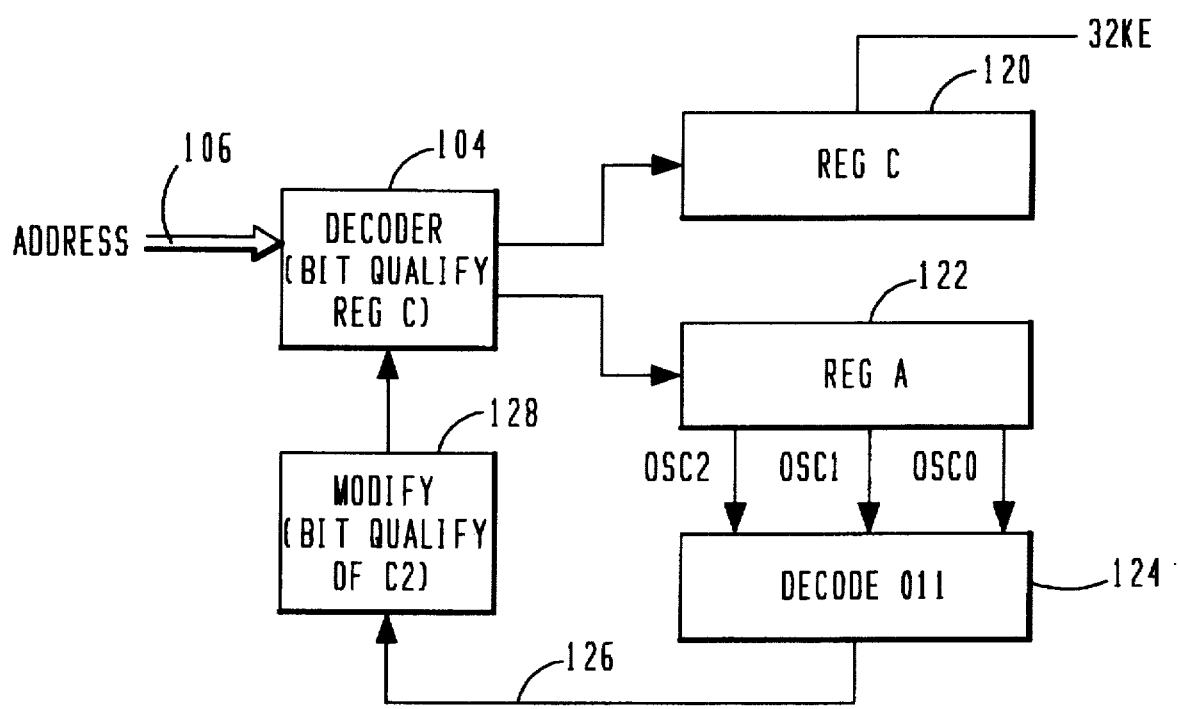
FIG. 9 illustrates a detail of the embodiment of FIG. 8.

Referring now to FIG. 9, there is illustrated in a more detailed block diagram of the embodiment of FIG. 8. In the embodiment of FIG. 9, two of the registers are illustrated, a register C 120 and a register A 122. As described above, register C is an eight-bit register which is a read-only event status register. Bits 0, 1 and 3 are unused bits with bit 2 being the 32KE bit. When this bit is set to a "1", the 32 kHz oscillator output is enabled, as described above. However, one aspect of the present invention is that the register C 120 can be reconfigured such that this single bit 2 is a Read/Write bit. This is a configuration that is a deviation from the PC-compatible operation of the part. In a PC-compatible part, this register is maintained in a pristine condition, wherein a user views this register as being a read-only register. However, for the operation wherein the bit must be written to a different logic state, the register C 120 is reconfigured. This reconfiguration occurs by writing a particular bit sequence to the read/write register A 122. The three bits that are involved are the OSCO, OSC 1 and OSC 2 bits, bits 4, 5 and 6 of the A register. When this bit sequence is "011", a decoder 124, similar to the decoder 112, outputs a logic "1" on an output line 126, similar to the line 116. This then controls a modification circuit 128 to cause bit C2 of register C 120 to become a Read/Write bit. Thereafter, when a user addresses the decoder 104, the decoder will not only decode the addressable location or register C 120, but will also allow bit 2 of that register to be a Read/Write bit and allow a "1" to be written thereto. This entire operation, the configuration operation, was initiated by writing the string "011" to be appropriate bits in register A.

The operation of setting the 32KE bit is first to address the register A location and write the OSC 0, OSC1 and OSC2 bits to a bit string "011". This is followed by a subsequent access or address to the memory addressing the register C location. Normally, this would allow only a READ operation. However, after the WRITE operation to register A as described above, bit 2 can now be written to a "1" to select the 32 kHz oscillator operation, wherein the multiplexer 41 selects the output of the buffer 43.

In summary, there has been provided a realtime clock system that provides for an increased amount of addressable storage locations, while allowing connection in a conventional manner. The conventional manner allows for only seven of the eight address bits to be input to the RTC. By providing for an external address bit, the amount of addressable memory locations can be doubled.

Although the preferred embodiment has been described in detail, it should be understood that various changes, substitutions and alterations can be made therein without departing from the spirit and scope of the invention as defined by the appended claims.

What is claimed is:

1. A realtime clock for interfacing with a personal computer having a first I/O port operable to interface with the realtime clock for being multiplexed to transmit and receive eight data bits in a first operation and transmit seven address bits in a second operation, comprising:

a memory having a plurality of addressable storage locations for storage of data therein and reading of data therefrom, each of said storage locations addressable, said memory receiving an 8-bit address input;

Read/Write circuitry for controlling said memory to either Read data from the addressed one of said storage locations or Write data to the addressed one of said storage locations;

a first address latch for receiving the transmitted seven address bits from a first PC bus external to the realtime clock through the first I/O port and latching the seven address bits therein for output on a latched address bus as the least seven significant bits of the address input to said memory, said first address latch operating in response to an address latch control signal;

a second address latch for receiving at least the eighth most significant address bit for said memory from a second PC bus separate from said first PC bus through a second I/O port external to the realtime clock and associated with the personal computer and latching the eighth most significant address bit and outputting it to said latched address bus as the eighth address bit to said memory, said second address latch operating in response to said address latch control signal;

said Read/Write circuitry operable to generate said address latch control signal during a multiplex operation, said multiplex operation operating in a first operation to receive said address and control said first and second address latches to latch said address and, in a second operation, to Read or Write data from said memory;

a clock/calendar circuit for generating data for storage in said memory as clock/calendar data, said clock/calendar circuit operable to periodically update said clock/calendar data; and a battery backup circuit for connecting to an external battery to render the realtime clock nonvolatile.

2. The realtime clock of claim 1, wherein said memory is operable to store bytes of data at said addressable storage locations.

3. The realtime clock of claim 1, wherein said clock/calendar circuit comprises:

a time-based generator for generating a periodic interrupt;

a clock/calendar circuit for maintaining and updating clock and calendar data; and transfer circuitry for transferring said updated clock/calendar data to said memory upon generation of said periodic interrupt.

4. The realtime clock of claim 3, wherein said timebase generator comprises a crystal controlled oscillator operating at a base frequency and a divider for dividing said base frequency to an output frequency, said periodic interrupt triggered off of the one edge of said output frequency.

5. The realtime clock of claim 4, and further comprising:

a square wave generator for generating an output square wave at an output frequency;

a programmable divider for dividing said base frequency to one of a plurality of frequencies for generating said square wave at one of said plurality of frequencies; and means for forcing said programmable divider circuit to divide by a factor of one to operate said square wave frequency at said base frequency rate.

6. The realtime clock of claim 5, and further comprising:

a multiplexer for selecting either the output of said square wave generator or the direct output of said crystal-controlled oscillator;

a first register for storing data and having an addressable location accessible by an address input to the realtime clock, said register operating as a read-only register in a first mode and as a partially read/write register in a second mode, wherein in said second mode, only a single bit of said first register can be written to;

a second register operating as a read/write register and accessible by an address received external to the realtime clock and having a predetermined number of bits therein which define whether said first register operates in the first mode or the second mode;

an interim decoder for receiving on the input thereof said predetermined bits and decoding a predetermined logic condition for said predetermined bits and outputting a decode signal when the logic data of said predetermined bit matches the decode operation of said interim decoder; and a reconfiguration device for reconfiguring said first register operating in said first mode to operate in said second mode when said decode output is generated.

* * * * *

UNITED STATES PATENT AND TRADEMARK OFFICE
CERTIFICATE OF CORRECTION

PATENT NO. : 5,606,680

DATED : February 25, 1997

INVENTOR(S) : Parvereshi et al.

It is certified that error appears in the above-identified patent and that said Letters Patent is hereby corrected as shown below:

Column 8, line 26, delete "hook-up", and insert therefor --hook up--;

Column 9, line 16, delete "them", and insert therefor --there--.

Signed and Sealed this

Twenty-eighth Day of October, 1997

*Attest:*

BRUCE LEHMAN

*Attesting Officer*    *Commissioner of Patents and Trademarks*